United States Patent
Jain et al.

(10) Patent No.: US 12,399,805 B2
(45) Date of Patent: Aug. 26, 2025

(54) METHOD AND SYSTEM FOR PROVIDING DELTA CODE COVERAGE INFORMATION FOR WORK ITEMS

(71) Applicant: OPSHUB INC., Palo Alto, CA (US)

(72) Inventors: Sandeep Jain, Palo Alto, CA (US); Aparna Garg, Gurgaon (IN)

(*) Notice: Subject to any disclaimer, the term of this patent is extended or adjusted under 35 U.S.C. 154(b) by 484 days.

(21) Appl. No.: 17/733,749

(22) Filed: Apr. 29, 2022

(65) Prior Publication Data
US 2023/0350788 A1 Nov. 2, 2023

(51) Int. Cl.
G06F 11/3668 (2025.01)

(52) U.S. Cl.
CPC ................ *G06F 11/3676* (2013.01)

(58) Field of Classification Search
CPC .................................................. G06F 11/3676
See application file for complete search history.

(56) References Cited

U.S. PATENT DOCUMENTS

| | | | | |
|---|---|---|---|---|
| 5,920,312 A * | 7/1999 | Wagner | ............ | G06F 9/451 715/962 |
| 10,289,532 B2 * | 5/2019 | Jain | ............ | G06F 11/3676 |
| 10,949,172 B1 * | 3/2021 | Jain | ............ | G06F 11/3676 |
| 2014/0068564 A1 * | 3/2014 | Jain | ............ | G06F 11/2082 717/124 |
| 2015/0268951 A1 * | 9/2015 | Wang | ............ | H04L 65/403 717/103 |
| 2016/0299835 A1 * | 10/2016 | Jain | ............ | G06F 11/3676 |
| 2017/0262361 A1 * | 9/2017 | Francis | ............ | G06F 11/3672 |
| 2018/0089063 A1 * | 3/2018 | Kral | ............ | G06F 11/3688 |
| 2018/0275970 A1 * | 9/2018 | Woulfe | ............ | G06F 8/70 |
| 2019/0287029 A1 * | 9/2019 | Sobran | ............ | G06F 8/71 |
| 2021/0056012 A1 * | 2/2021 | Nadein | ............ | G06F 11/3624 |

OTHER PUBLICATIONS

Paul Marinescu et al., "COVRIG: A Framework for the Analysis of Code, Test, and Coverage Evolution in Real Software," 2014 [retrieved on Mar. 1, 2025], ISSTA 2014: Proceedings of the 2014 International Symposium on Software Testing and Analysis, pp. 93-104, downloaded from <url>:https://dl.acm.org. (Year: 2014).*
Marko Ivankovic et al., "Code Coverage at Google," 2019 [retrieved Jun. 26, 2025], Proceedings of the 2019 27th ACM Joint Meeting on European Software Engineering Conference and Symposium on the Foundations of Software Engineering, pp. 955-963, downloaded from <url>:https://dl.acm.org. (Year: 2019).*

* cited by examiner

*Primary Examiner* — S. Sough
*Assistant Examiner* — Stephen D Berman
(74) *Attorney, Agent, or Firm* — Joy S Goudie

(57) ABSTRACT

A processor implemented method for computing delta code coverage information for work items are provided. The method includes fetching details associated with one or more files touched between a start tag and an end tag from a source code management (SCM) tool; fetching one or more lines that are one of added, modified, or removed, for a given file, between the start tag and the end tag; fetching commit details; determining a map with work item id as key and a list of delta lines corresponding to the work item and computing, using a delta code coverage module, delta code coverage information corresponding to the fetched work items, by obtaining a list of delta lines for checking a number of delta lines covered as per the given coverage file for each work item id in the map.

14 Claims, 16 Drawing Sheets

METHOD AND SYSTEM FOR PROVIDING DELTA CODE COVERAGE INFORMATION FOR WORK ITEMS

BACKGROUND

Technical Field

The embodiments herein, in general, relate to software testing. More particularly, the embodiments herein relate a method and system for providing delta code coverage information for work items.

Description of the Related Art

Generally, there are several known techniques for getting code coverage for changed code (such as the technology described in the US granted patent Ser. No. 10/289,532B2). However, the currently known techniques provide delta code coverage (DCC) only at line, file, or branch level. Typically, software testers or developers need to then identify work items manually for which a given file with low DCC was modified and add more tests accordingly. Moreover, for team leads, it not possible to know if a work item (feature, bug) is appropriately tested. Therefore, DCC at source code level becomes too low-level information for developers to quickly use and act. Accordingly, to determine appropriate QA or developer whose commit contributed to a low DCC, a technique typically used by most of development and QA teams is to look at files with low DCC and go to source control to analyze users who made changes in each file with low DCC. If multiple users modified same file, then the process becomes complicated as then the analysis shifts to line level. To identify correct assignee, one needs to look at lines not covered and then for each line check in source control as to who touched that line. The process is time taking and error prone. Additionally, as team size increases, it becomes difficult to manually enable quick action on commits or work items with loss DCC. Moreover, baseline DCC requirement for every work item is not necessarily same. Notably it is acceptable for work items fixed in less used components to have relatively low DCC baseline, compare to work items impacting most used product components. However, organizations may want defects to have 95%+ DCC but for new features 90%+ DCC is generally acceptable. The unavailability of any system today to provide DCC at work item is renders it too difficult to enforce work item wise DCC checks or DCC is not looked at all.

Hence, there is a long felt need for a system and a method for providing DCC at work item level, while addressing the above-recited problems associated with the related art.

SUMMARY

This summary is provided to introduce a selection of concepts in a simplified form that are further disclosed in the detailed description. This summary is not intended to determine the scope of the claimed subject matter.

The embodiments herein address the above-recited needs for a system and a method for identifying and segregating lines touched in same file for different work items, for accurate DCC. DCC at work item level that enables teams to quickly identify work items with low DCC, enforce area, module, product and likewise DCC criteria.

In an aspect, a processor implemented method for computing delta code coverage information for work items is provided. The method includes fetching, using a file touched module, details associated with one or more source code files touched between a start tag and an end tag from a source code management (SCM) tool. The method further includes fetching using a delta lines module, one or more lines that are at least one of: added, modified, or removed, for a given file, between the start tag and the end tag, and a line information including at least one of: a line number, an old line number, an operation that was performed on the corresponding at least one of: line, a file path, an old file path and a file operation. The method further includes fetching using a commit details module, commit details comprising at least a commit unique identifier (ID), a commit time, a commit message, a commit author, merged commits or any work item linked to commit directly. The method further includes determining using a work item details module, a map with work item id as key and a list of delta lines corresponding to the work item and the method further includes computing, using a delta code coverage module, delta code coverage information corresponding to the fetched work items, by obtaining a list of delta lines for checking a number of delta lines covered as per the given coverage file for each work item id in the map.

In an embodiment, the method further includes receiving at least one of: the start tag, the end tag, a code coverage file data, by a user via an interface, prior to fetching details associated with one or more work items.

In an embodiment, fetching the details of files includes fetching the files touched and on whom an operation comprising at least one of adding, renaming modifying and, deleting is performed between the start tag and the end tag from an (SCM) system using P4 diff2 or Git Diff equivalent command, wherein Git Diff comprises file information comprising at least a file path, an old path of file, and an operation performed on file. The method further includes iterating on the fetched files and the method further includes filtering one or more files where the operation is removed and returning remaining files.

In an embodiment, iterating on the fetched files includes obtaining a file_operation from the files touched. The method further includes setting an old path to file path of the current file from file touched details where file_operation is not re-named, and the method further includes adding touched file to array file touched where file_operation is not removed.

In an embodiment, obtaining a list of delta lines includes initializing variable delta_lines as array of line information. The method further includes performing equivalent command diff on file between an old file_path in the start tag and a file path in the end tag, showing all lines that were touched and operation performed on each touched line between the start tag and the end tag if the work item is renamed or modified. The method further includes fetching all the delta lines of file from current file path from the end tag if the file was added. The method further includes iterating through the files that are touched, and the method further includes determining the delta_lines.

In an embodiment, iterating through the delta lines includes skipping a line and executing next line upon a line_operation being removed. The method further includes adding line details comprising at least a line number, an operation performed on a line, a file name, a file path, and an operation performed on the file, to variable delta lines.

In an embodiment, fetching commit details includes finding commit ID between the start tag and the end tag, comprising end tag, in which the delta line was touched, where if the file was renamed then blame or annotate is done on old file path, instead of file path. The method further includes fetching commit details of commit obtained from blame and annotate the commit details, wherein the SCM tools have command or application programming interface (API) to fetch commit details comprising at least a commit ID, a commit time, a commit author, a commit message, a merged commit and a work item linked to commit directly.

In an embodiment, the SCM tools provide built in commands to find commit that touched a given line.

In an embodiment, the method of determining work item details includes initializing variable workitem_wise_delta_lines as map of work item id and delta lines list. The method further includes iterating on commit details for each commit ID and the method further returning workitem_wise_delta_lines.

In an embodiment, iteration includes parsing work item id(s) from commit comments or get work item id from linked work item id(s) or from merged commits and the method further includes adding work item id to the map workitem_wise_delta_lines and add all the delta lines against commit ID being iterated to the list of delta lines against given work item id.

In an embodiment, the method of computing delta code coverage includes parsing coverage file and store parsed information in a file wise map containing information if a line is covered or not in a given file. The method further includes initializing variable workitem_wise_DCC as map with work item id as key and DCC % as value. The method further includes iterating through each work item in workitem_wise_delta_lines. The method further includes calculating DCC percentage-(total_delta_covered_lines*100) divided by total_delta_lines and the method further includes adding to map workitem_wise_dcc–work item id as key and DCC percentage as value.

In an embodiment, the iteration includes initializing total_delta_lines and total_delta_covered_lines to zero. The method further includes iterating through delta lines for given work item by fetching line coverage details from file_wise_coverage using file path in delta line. The method further includes taking line number from delta lines and increment total_delta_lines if that line number exists in line coverage details for this file, where inexecutable lines are absent from the line coverage details and the method further includes taking line number from delta lines and increment total_delta_covered_lines if that line number exists in line coverage details for the file and line is covered.

In an embodiment, the coverage data obtained in any file format is converted into map of files with line coverage information.

According to another aspect a system for providing delta code coverage information for work items is provided. The system includes a memory including one or more executable modules and a processor configured to execute the one or more executable modules for identifying work item wise delta code coverage, the one or more executable modules includes a file touched module for fetching details associated with one or more files touched between a start tag and an end tag from a source code management (SCM) tool. The system further includes a delta lines module for fetching one or more lines that are one of: added, modified, or removed, for a given file, between the start tag and the end tag, and a line information includes at least one of: a line number, an old line number, an operation that was performed on the corresponding line, a file path, an old file path and a file operation. The system further includes a commit details module for: fetching commit details comprising at least a commit ID, a commit time, a commit message, a commit author, merged commits, or any work item linked to commit directly. The system further includes a work item details module for determining a map with work item id as key and a list of delta lines corresponding to the work item and the system further includes a delta code coverage module for computing delta code coverage information corresponding to the fetched work items, where for each work item id in map, by obtaining a list of delta lines for checking a number of delta lines covered as per the given coverage file.

In an embodiment, the one or more modules further includes a data module for receiving at least one of: the start tag, the end tag, a code coverage file data, by a user via an interface, prior to fetching details associated with one or more files.

In an embodiment, the files touched module is further configured to fetch the files touched and on whom an operation comprising at least one of adding, renaming, modifying, and deleting is performed between the start tag and the end tag from an source code management (SCM) system using P4 diff2 or Git Diff equivalent command, wherein Git Diff will give file information comprising at least a file path, an old path of file, and an operation performed on file. Iterate on the fetched files and filter one or more files where operation is removed and returning remaining files.

In an embodiment, the delta lines module is further configured to obtain a file_operation from the files touched where file_operation is not renamed and set an old path to file path of the current workfile from file touched details and add touched file to array file_touched where file_operation is not removed.

In an embodiment, the delta lines module is further configured to initialize variable delta_lines as array of line information, perform equivalent command diff on file between an old_path in the start tag and file path in the end tag showing all lines that were previously touched and operation performed on each touched line between the start tag and the end tag if the file is renamed or modified, fetch all the delta lines of work item from current file path from the end tag if the file was added, and iterate through the files that were previously touched and determine the delta_lines.

In an embodiment, the delta lines module is further configured to: skip a line and execute next line upon a line_operation being removed and add line details comprising at least a line number, an operation performed on a line, a file name, a file path, and an operation performed on the file to variable delta_lines.

In an embodiment, the fetching commit details module is configured to find commit ID between the start tag and the end tag, comprising end tag, in which the delta line was touched, where if the file was renamed then blame or annotate is done on old file path, instead of file path and fetch commit details of commit obtained from blame and annotate the commit details. The SCM tools have command or API to fetch commit details including at least a commit ID a commit time, a commit author, a commit message, a merged commits, and a work item linked to commit directly.

In an embodiment, the work item details module is further configured to initialize variable workitem_wise_delta_lines as map of work item id and delta lines list and iterate on commit details for each commit ID and return workitem_wise_delta_lines.

In an embodiment, the work item details module is further configured to parse work item id(s) from commit comments or get work item id from linked work item id(s) or from merged commits and add work item id to the map workitem- _wise_delta_lines and add all the delta lines against commit ID being iterated to the list of delta lines against given work item id.

In an embodiment, the delta code coverage module is further configured to parse coverage file and store parsed information in a file wise map which containing information if a line is covered or not in a given file. The map is termed as file_wise_coverage. The variable workitem_wise_DCC is initialized as map with work item id as key and DCC % as value, iterate through each work item in workitem_wise_delta_lines, and calculate DCC percentage–(total_delta_covered_lines*100) divided by total_delta_lines and add to map workitem_wise_dcc work item id as key and DCC percentage as value.

In an embodiment, the delta code coverage module is further configured to initialize total_delta_lines and total_delta_covered_lines to zero and iterate through delta lines for given work item by fetching line coverage details from file_wise_coverage using file path in delta line, take line number from delta lines and increment total_delta_lines if the corresponding line number exists in line coverage details for the work file, in executable lines are absent from the line coverage details and takes line number from delta lines and increment total_delta_covered_lines if that line number exists in line coverage details for the file and the line is covered.

In an embodiment, the coverage data is obtained in any file format and is converted into map of files with line coverage information. In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

BRIEF DESCRIPTION OF DRAWINGS

The embodiments herein will be better understood from the following detailed description with reference to the drawings, in which:

The foregoing summary, as well as the following detailed description, is better under-stood when read in conjunction with the appended drawings. For illustrating the embodiments herein, exemplary constructions of the embodiments are shown in the drawings. However, the embodiments herein are not limited to the specific components and methods disclosed herein. The description of a component or a method step referenced by a numeral in a drawing is applicable to the description of that component or method step shown by that same numeral in any subsequent drawing herein.

FIG. 2L-3B is a process flow diagram illustrating the process of computing delta code coverage information using delta code coverage module, in accordance with an embodiment.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a system and method of providing delta code coverage information for work items. The various embodiment of the present invention enables computing DCC at work item level. The system of the present technology is capable of identifying and segregating lines touched in same file for different work items, for accurate DCC. The computation of DCC at work item level enables teams to quickly identify work items with low DCC, enforce area, module, product and likewise DCC criteria. The present system can share the machine with other SCM or ALM systems without requiring any additional configuration to be done in system. The system of the present technology can be extended to fetch any other work item information like assignee, area path, team, release, component, product, sprint and like from ALM tool. The system of the present technology can be tuned to identify DCC information at component, product, team, release and like, on basis of work item data. The system of the present technology is intended to work with any SCM system, any ALM system, any coverage tool or it is not limited to a specific tool.

Figure 1:
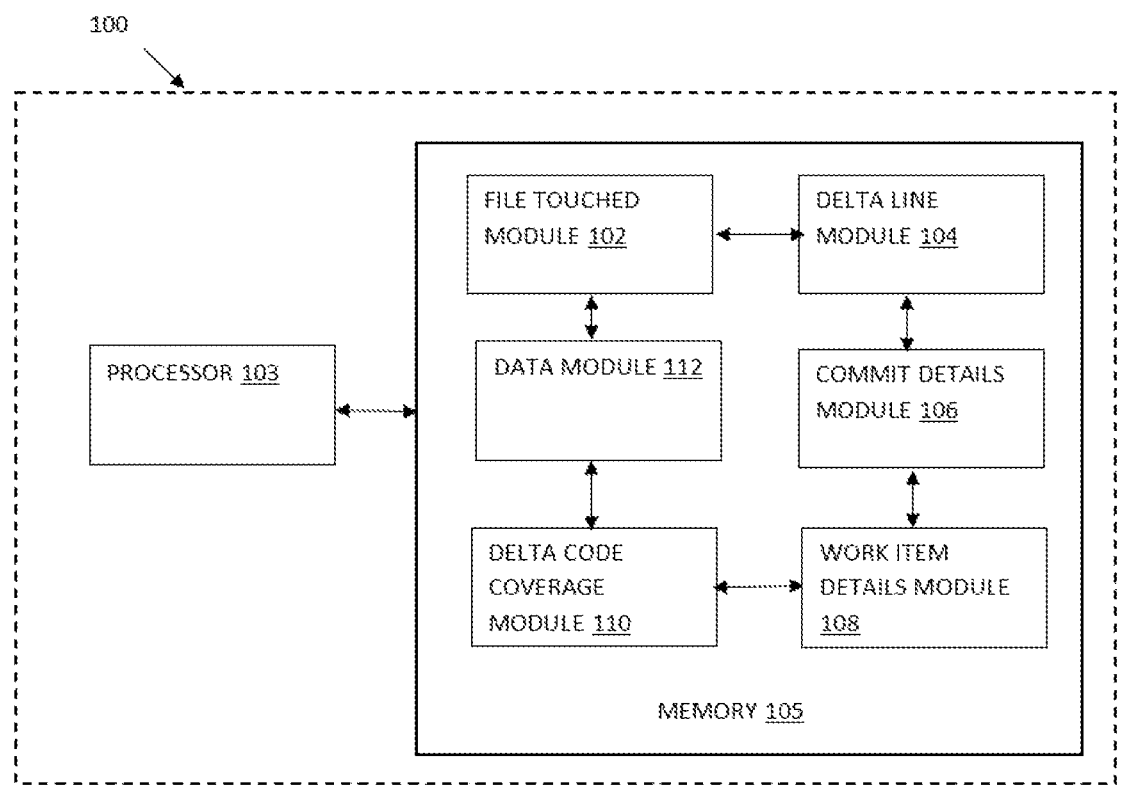
FIG. 1. illustrates a block diagram of a system for providing delta code coverage information for work items, in accordance with an embodiment.

FIG. 1 illustrates the block diagram of a system 100 for providing delta code coverage information for work items, in accordance with an embodiment. In an embodiment, the system 100 for providing delta code coverage information for work items, includes a memory 105 comprising one or more executable modules and a processor 103 configured to execute the one or more executable modules. The one or more executable module includes a file touched module 102, a delta lines module 104, a commit details module 106, a work item details module 108 and a delta code coverage module 110, and a data module 112. In an embodiment, the data module 112 is configured for receiving at least one of: the start tag, the end tag, a code coverage file data, by a user via an interface, prior to fetching details associated with one or more files. The file touched module 102 is configured for fetching details associated with one or more files touched between the start tai and the end tag from a source code management (SCM) tool. The files touched module 102 is further configured to fetch the files touched and on whom an operation comprising at least one of adding, renaming, modifying, deleting is performed between the start tag and the end tag from an source code management (SCM) system using P4 diff2 or Git Diff equivalent command, wherein Git Diff will Live file information comprising at least a file path, an old path of file, and an operation performed on file, iterating on the fetched files and filtering one or more files where operation is removed and returning remaining files.

The delta lines module 104 is configured for fetching one or more lines that are one of: added, modified, or removed, for a given file, between the start tag and the end tag, and a line information comprising at least one: a line number, an old line number, an operation that was performed on the corresponding line, a file path, an old file path and a file operation. The delta lines module 104 is further configured to obtain a file_operation from the files touched where file_operation is not renamed, set an old path to file path of the current workfile from file touched details and add touched file to array file_touched where file_operation is not removed. The delta lines module 104 is further configured to initialize variable delta_lines as array of line information, perform diff on file between an old_path in the start tag and file path in the end tag showing all lines that were previously touched and operation performed on each touched line between the start tag and the end tag if the file is renamed or modified, fetch all the delta lines of file from current file path from the end tag if the file was added and iterate through the files that were previously touched. The delta lines module 104 is further configured to skip a line and executing next line upon a line_operation being removed and add line details comprising at least a line number, an operation performed on a line, a file name, a file path, and an operation performed on the file to variable delta_lines.

The commit details module 106 is configured for fetching commit details comprising at least a commit ID, a commit time, a commit message, a commit author, merged commits or any work item linked to commit directly. The commit details module 106 is configured to find commit ID between the start tag and the end tag, comprising end tag, in which the delta line was touched, wherein if the file was renamed then blame or annotate is done on old file path, instead of file path and fetch commit details of commit obtained from blame and annotate the commit details, where SCM tools have command or API to fetch commit details comprising at least commit ID, commit time, commit author, commit message, merged commits and a work item linked to commit directly.

The work item details module 108 is configured for determining a map with work item id as key and a list of delta lines corresponding to the work item. The work item details module 108 is further configured to initialize variable workitem_wise_delta_lines as map of work item id and delta lines list and iterate on commit_details for each commit ID. The work item details module 108 is further configured to parse work item id(s) from commit comments or get work item id from linked work item id(s) or from merged commits and add work item id to the map workitem_wise_delta_lines and add all the delta lines against commit ID being iterated to the list of delta lines against given work item id.

The delta code coverage module 110 is configured for computing delta code coverage information corresponding to the fetched work items, where for each work item id in map a list of delta lines is obtained for checking a number of delta lines covered as per the given coverage file. The delta code coverage module 110 is further configured to parse coverage file and store parsed information in a file wise map which contains information if a line is covered or not in a given file. The map is called as file_wise_coverage. The delta code coverage module 110 is further configured to initialize variable workitem_wise_dcc as map with work item id as key and DCC % as value, iterate through each work item in workitem_wise_delta_lines, calculate DCC percentage=(total_delta_covered_lines*100) divided by total_delta_lines and add to map workitem_wise_dcc-work item id as key and DCC percentage as value. The delta code coverage module 110 is further configured to initialize total_delta_lines=0 and total_delta_covered_lines=0, iterate through delta lines for given work item by, fetch line coverage details from file_wise_coverage using file path in delta line, take line number from delta lines and increment total_delta_lines if that line number exists in line coverage details for this file. The inexecutable lines are absent from the line coverage details and take line number from delta lines and increment total_delta_covered_lines if that line number exists in line coverage details for the file and line is covered. The coverage data is obtained in any file format. The parsers are used to parse javascript object notation (JSON), extensible markup language (XML) or any other structure and convert it into map of files with line coverage information.

In an embodiment, each of the components of the system 100 disclosed herein, for example, the file touched module 102, the delta line module 104, the data module 112, the commit details module 106, the work item details module 108, and the delta code coverage module 110 are programmable using high-level computer programming languages.

The system 100 disclosed herein comprises multiple processors and non-transitory, computer-readable storage media, for example, memory units, across the framework for storing computer program instructions defined by the components, for example, the file touched module 102, the delta line module 104, the commit details module 106, the work item details module 108, the delta code coverage module 110 and the data module 112 of the system 100. The processors are operably and communicatively coupled to the memory units for executing the computer program instructions defined by the components, for example, the file touched module 102, the delta line module 104, the data module 105, the commit details module 106, the work item details module 107, and the delta code coverage module 108 of the system 100. The processors refer to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. The system 100 disclosed herein is not limited to employing processors. In an embodiment, the system 100 employs one or more controllers or microcontrollers. In an embodiment, the file touched module 102, the delta line module 104, the data module 112, the commit details module 106, the work item details module 108, and the delta code coverage module 110 of the system 100, each defines computer program instructions, which when executed by respective processors, cause the processors to specify and manage predefined policies for containerized workloads. The processors retrieve instructions defined the file touched module 102, the delta line module 104, the data module 112, the commit details module 106, the work item details module 108, and the delta code coverage module 110 of the system 100 from respective memory units for executing respective functions disclosed above.

Figure 2A:
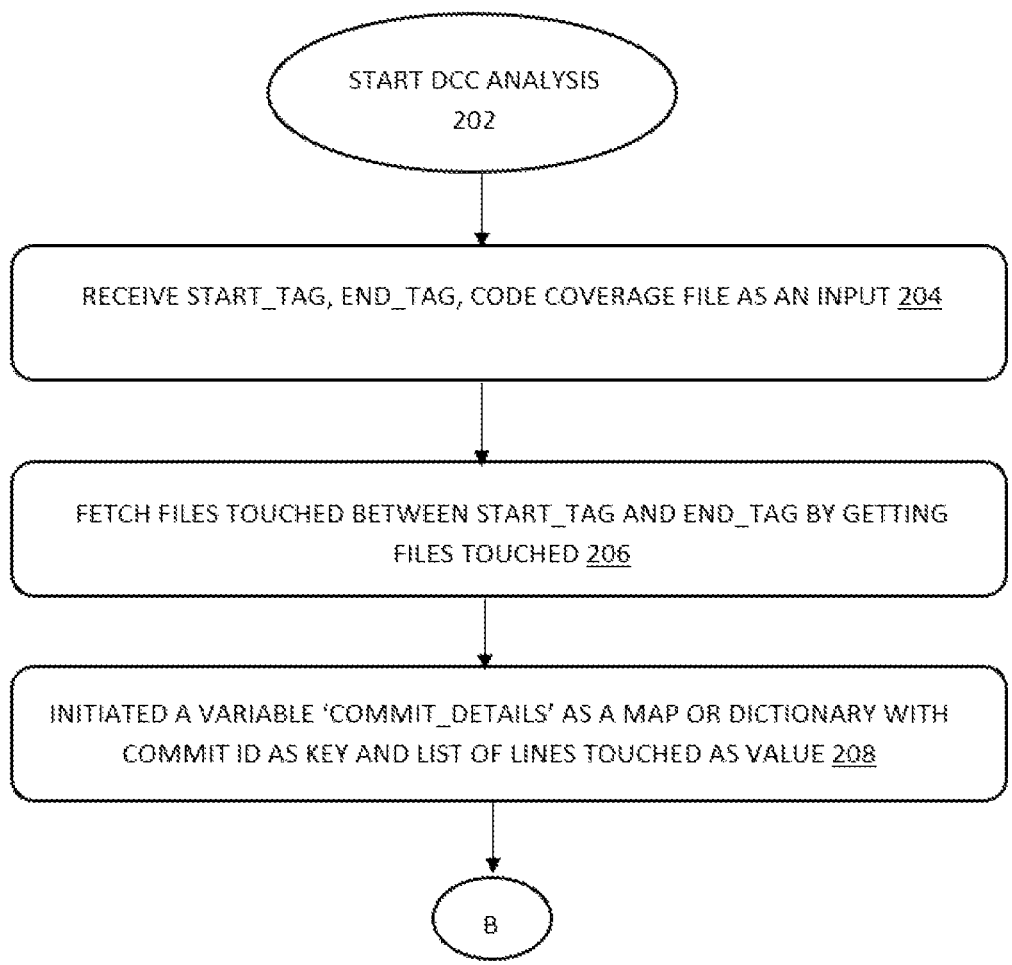
FIG. 2A-2C is a process flow diagram illustrating the process of providing delta code coverage information for work items, in accordance with an embodiment.
Figure 2B:
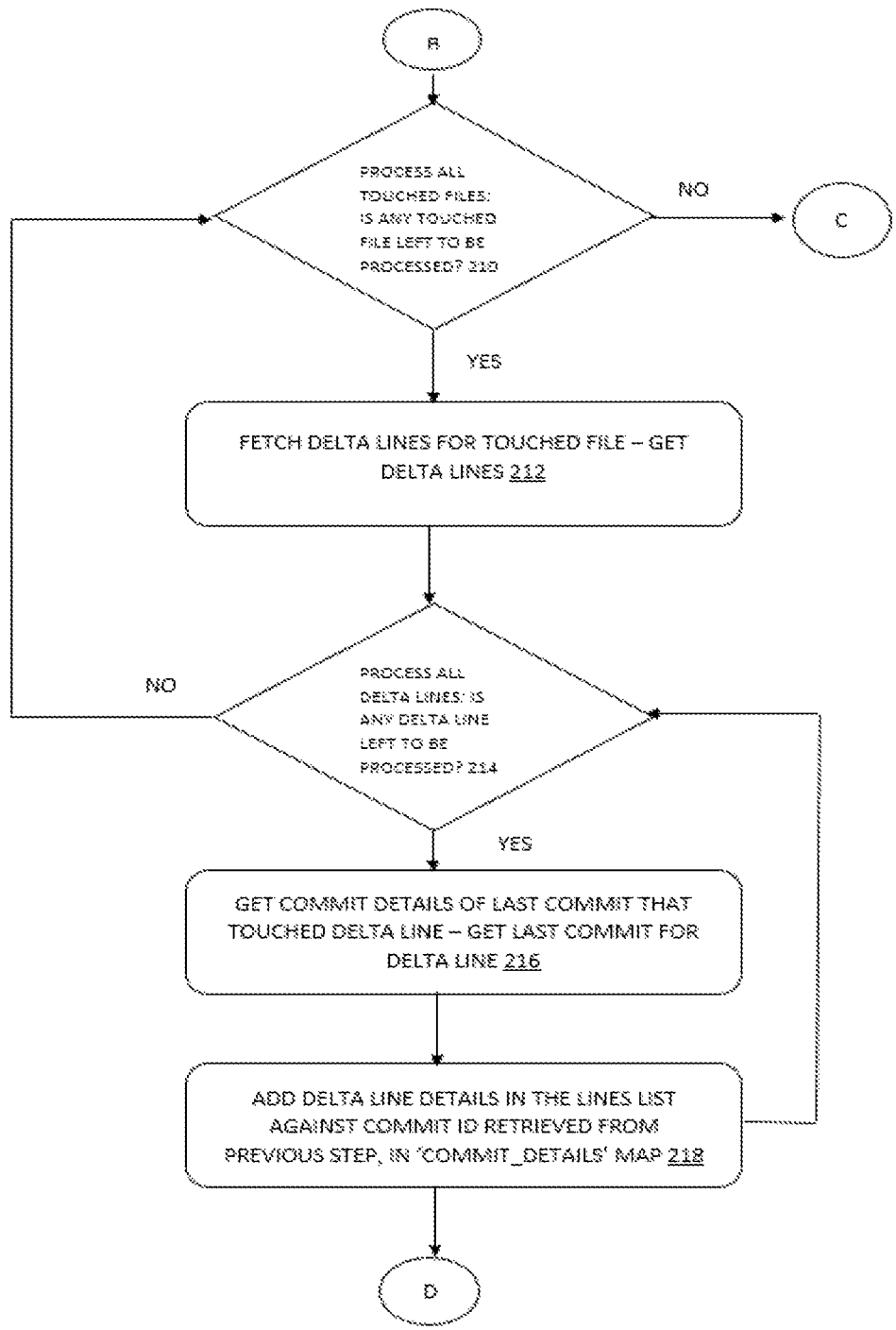
Figure 2C:
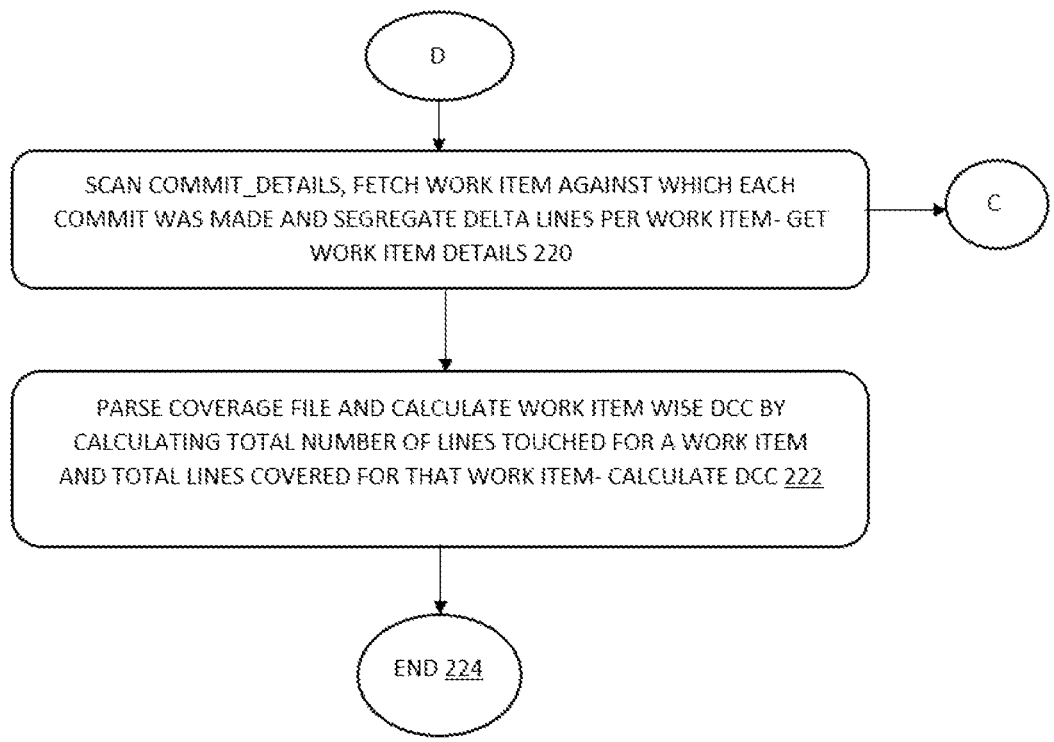

FIG. 2A-2C is a process flow diagram illustrating the process of providing delta code coverage information for work items, in accordance with an embodiment. The process begins at step 202. At step 204, the start tag, an end tag and the coverage file is received as input. The code coverage file is a coverage file generated by code coverage tools including for example, Jacoco®, Cobertura®, and the like and has line level information for each file in source code, if a given line is tested or not. The end tag is a source control management (SCM) tag name or commit ID from source control management. The end tag is the commit ID or state of source code repository, as of which coverage file was generated. The start tag is a SCM tag name since when user wants to scan changes for calculating work item wise DCC. The start tag must be with a commit that was done before end tag. At step 206, files touched between the start tag and the end tag are fetched by files touched module. The file touched module takes the start tag and the end tag as input and returns details of files added, renamed, or modified between the start tag and the end tag. At step 208, a variable ' commit_details' is initiated as a map or dictionary with commit ID as key and list of lines touched as value. At step 210, all touched files are processed. The delta line module is configured to fetch lines added, modified, or removed for a given file, between the start tag and the end tag at step 212. For each line, there is information such as a line number, an old line number, an operation that was performed on a line, a file path, an old file path and the file operation. Subsequently at step 214, all the delta lines are processed. If any delta line is left to be processed then steps 210 to 214 are repeated. In this way, when all the touched files are processed at step 210, if there is no touched file left to be processed, then at step 220, the commit_details are scanned. The work item against which each commit was made, is fetched and the delta lines per work item is segregated by work item details module.

The work item details module takes commit details map passed from main module and return work item wise segregated delta lines. At step 222, the coverage file is parsed and the work item wise DCC is calculated by calculating total number of lines touched for a work item and total lines covered for the corresponding work item. The calculation is done by using DCC module. The DCC module takes workitem_wise_delta_lines using map of work item id and list of delta lines touched for that work item id, and coverage file. For each work item, it calculates total number of executable lines touched and total lines covered from coverage file. The total lines touched and total lines covered is then used to calculate DCC for the corresponding work item. At step 214, if any delta line is left to be processed then at step 216, the commit details of last commit that touched delta line is fetched by commit details module. At step 218, the delta line details are added in the lines list against the commit ID retrieved from previous step in the commit details map. Then it is continued with step 220 and 222.

Figure 2D:
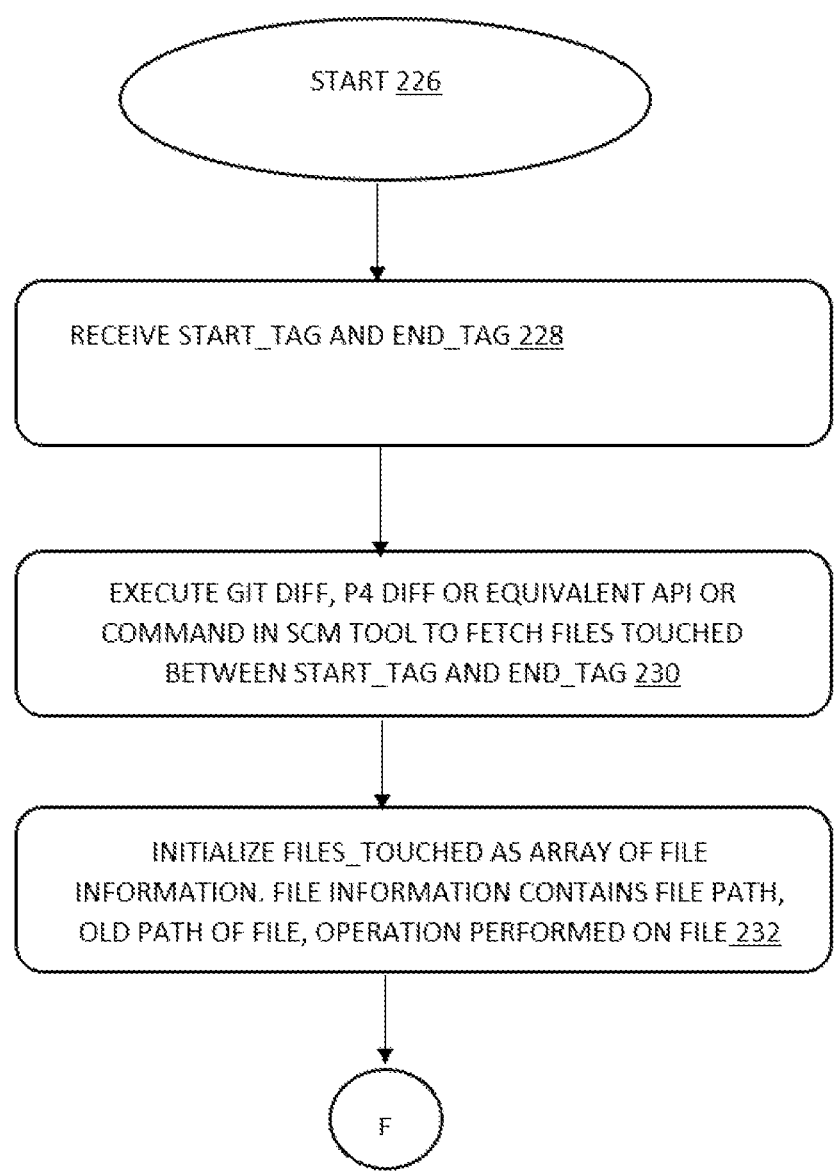
FIG. 2D-2E is a process flow diagram illustrating the process of fetching details of touched files using files touched module, in accordance with an embodiment.
Figure 2E:
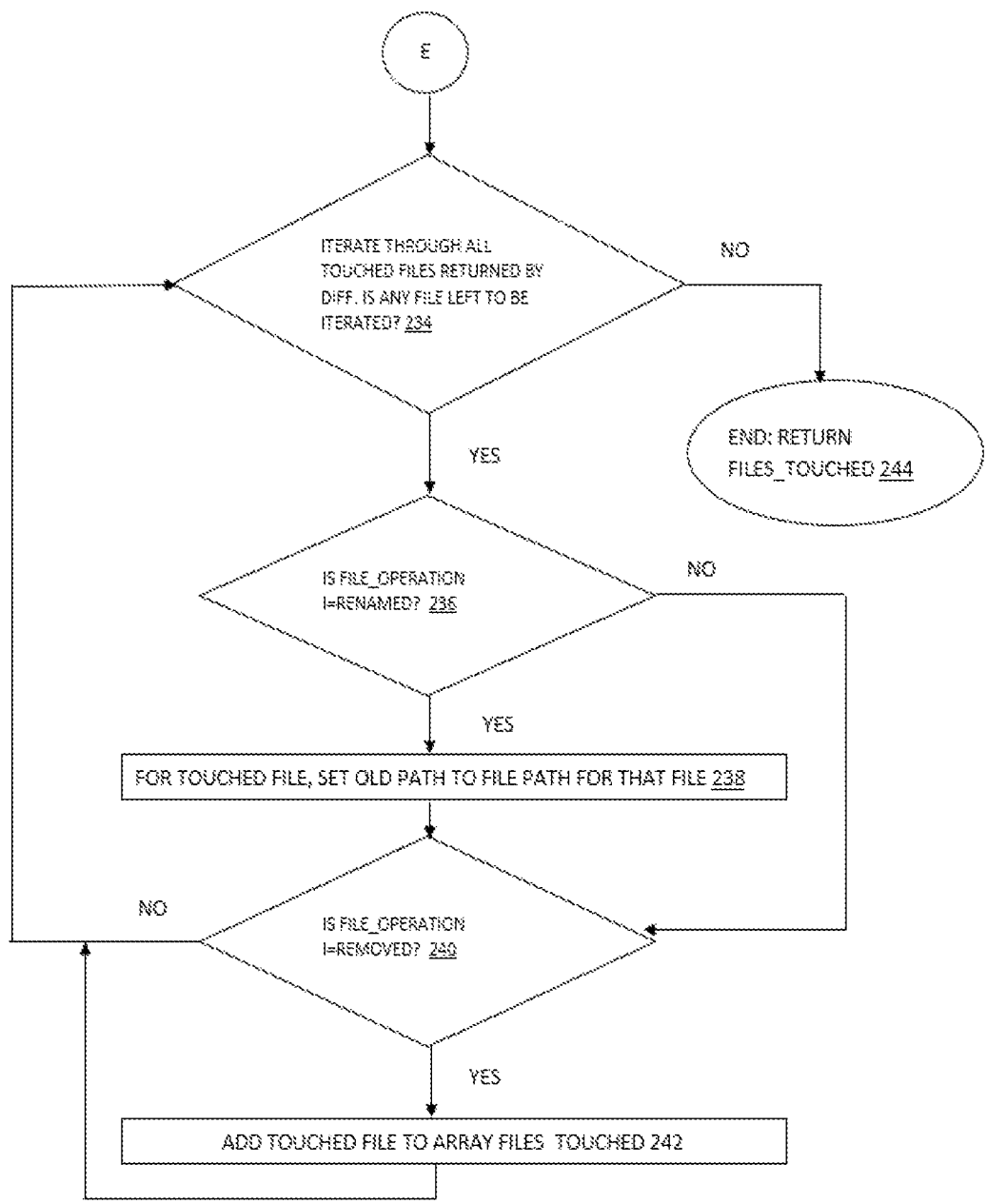

FIG. 2D-2E is a process flow diagram illustrating the process of fetching details of files using files touched module, in accordance with an embodiment. The process starts with step 206. The files touched module takes start tag and end tag as input and returns details of files added, renamed, or modified between start tag and end tag. At step 228, the start tag and the end tag are received. At step 230 Git diff, P4 diff or equivalent API or command in SCM tool is executed to fetch the files touched between the start tag and the end tag. At step 232, the files_touched is initialized as an array of file information. File information contains the file path, an old path of file and an operation performed on file. At step 234, all touched files returned by diff are iterated. If any file is left to be iterated then at step 236, it is determined if the file_operation is not equal to removed. If it is equal then at step 238, for the touched file set the old path to the current file. If no, then step 240 is executed. At step 240, it is checked if file_operation is removed. If file_operation is removed, then at step 242, the touched file is added to array files_touched. At step 234, if no file is left to be iterated then at step 234, return the files touched.

Figure 2F:
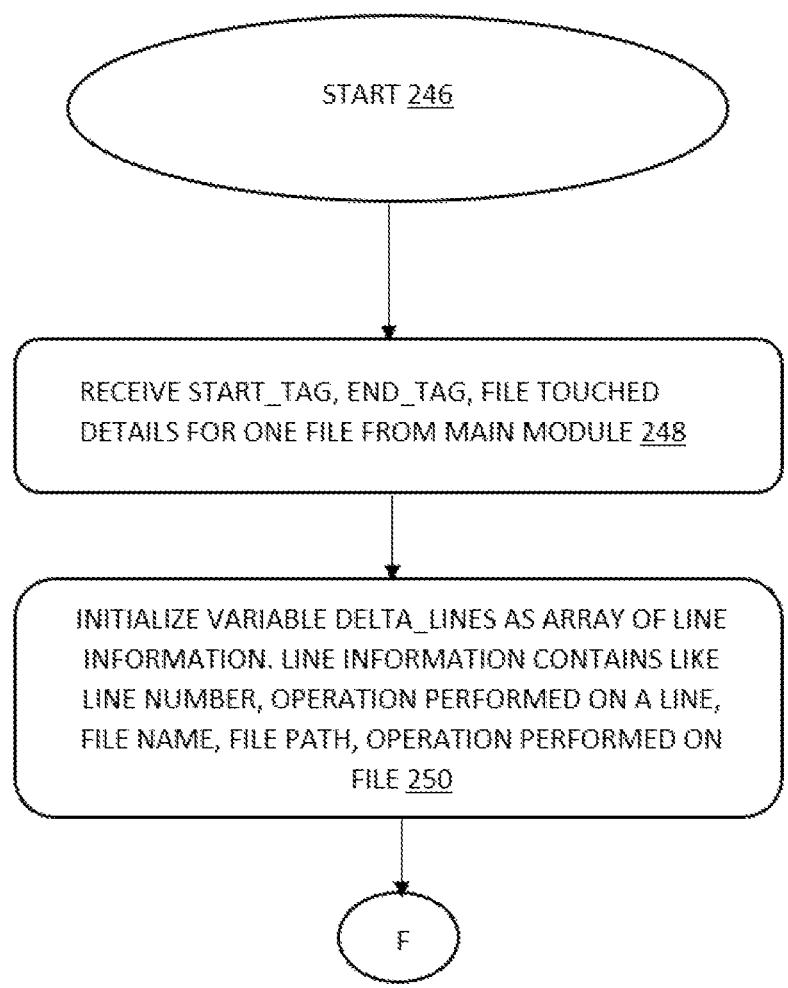
FIG. 2F-2H is a process flow diagram illustrating the process of obtaining a list of delta lines using the delta lines module, in accordance with an embodiment.
Figure 2G:
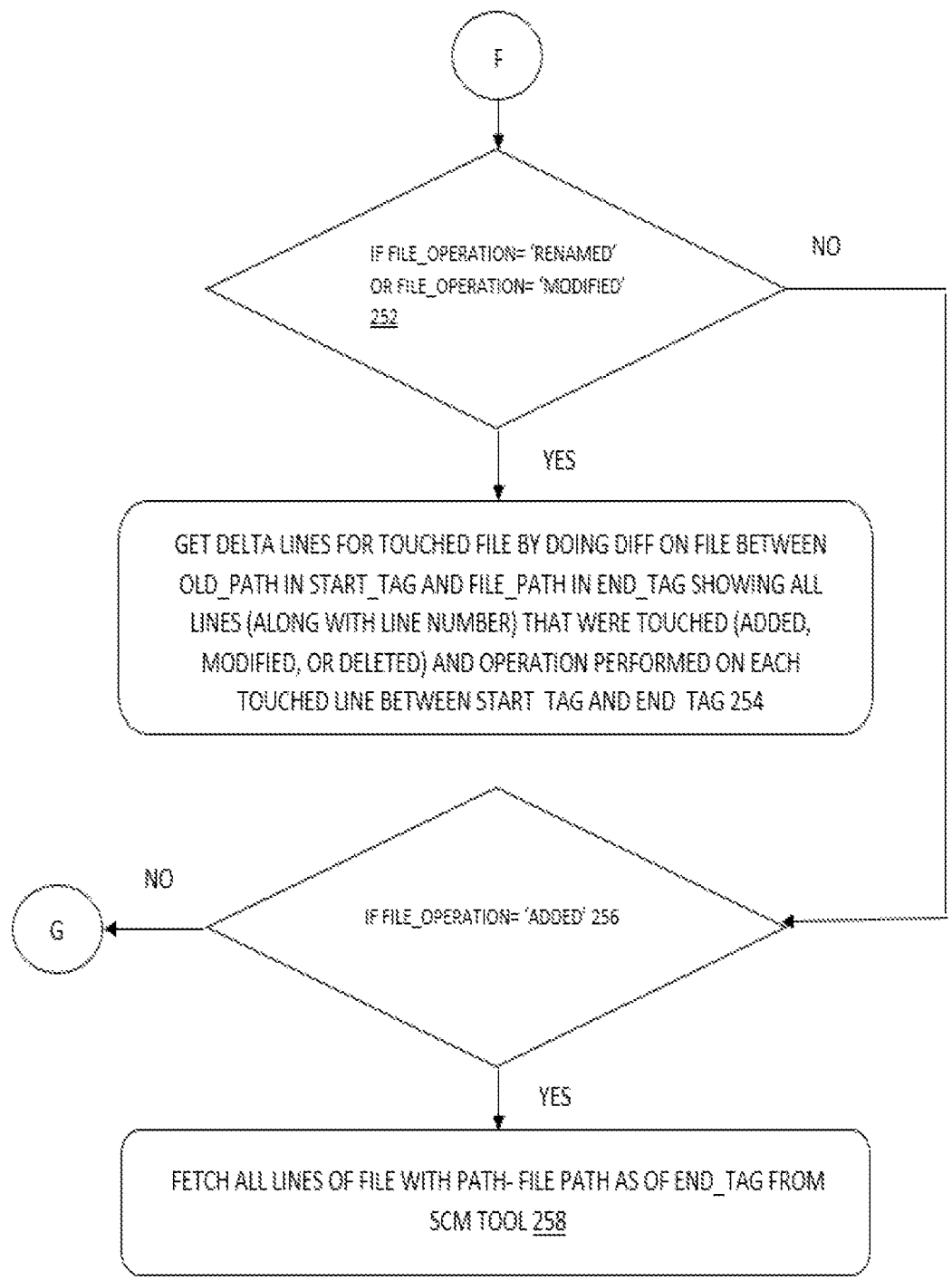
Figure 2H:
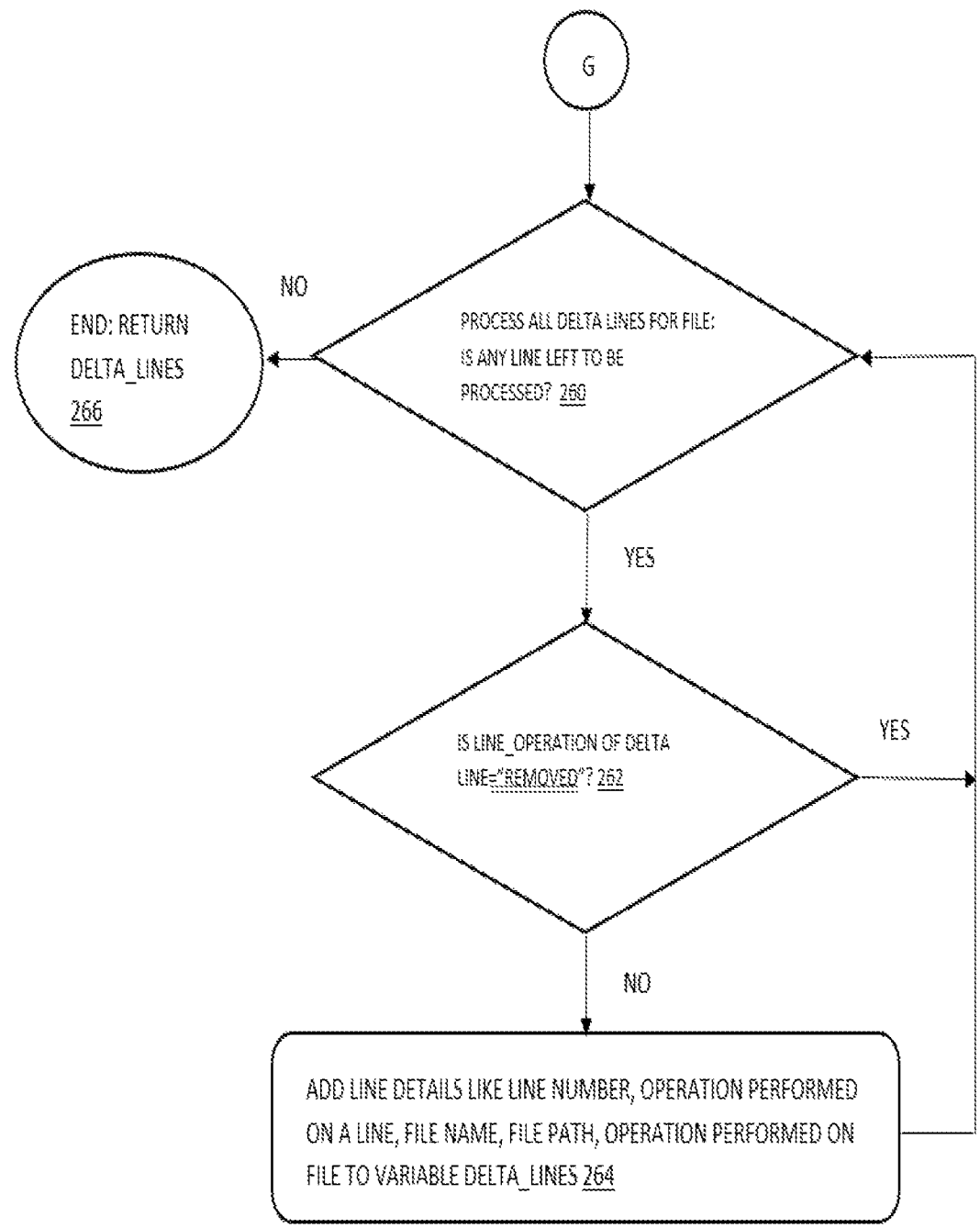

FIG. 2F-2H is a process flow diagram illustrating the process of obtaining a list of delta lines using the delta lines module, in accordance with an embodiment. The process starts at step 246. The delta lines module fetches all lines modified or deleted in a given file between the start tag and the end tag. The delta lines module takes the file touched details (file path, file old path, operation performed), the start tag and the end tau as input and returns delta lines between the start tag and the end tag for the corresponding work file. At step 248, the start tag, the end tag and the file touched details for one file is received from the main module. At step 250, the variable delta lines is initialized as array of line information. The line information contains such as a line number, an operation performed on a line, a file name a file path and operation performed on a file. At step 252, it is determined if file_operation is equal to "renamed" or "modified". If it is equal then at step 254, the delta lines for touched file is obtained by performing diff on file between an old_path in the start tag and the file_path in an end tag showing all lines (along with line number) that were previously touched (added, modified, or deleted) and an operation is performed on each touched line between the start tag and the end tag. At step 252, if file_operation is not equal to "renamed" or "modified" then step 256 is performed. At step 256, it is determined if file_operation is equal to "added". If it is equal then step 258 is performed. At step 258, all lines of a file with path is fetched. The file path is fetched as end tag from SCM tool. At step 256, if file_operation is not equal to "added" then at step 260, all the delta lines for a file is processed. If any line is left to be processed then at step 262, it is determined if the line_operation of delta line is equal to "removed". If it is equal then steps 260 to 262 is repeated. If it is not equal then at step 264, line details such as a line number, an operation performed on a line, a file name, the file path and an operation performed on file is added to variable delta_lines. In this way, at step 260 if there is no line to be processed then at step 266, the delta_lines are returned.

Figure 2I:
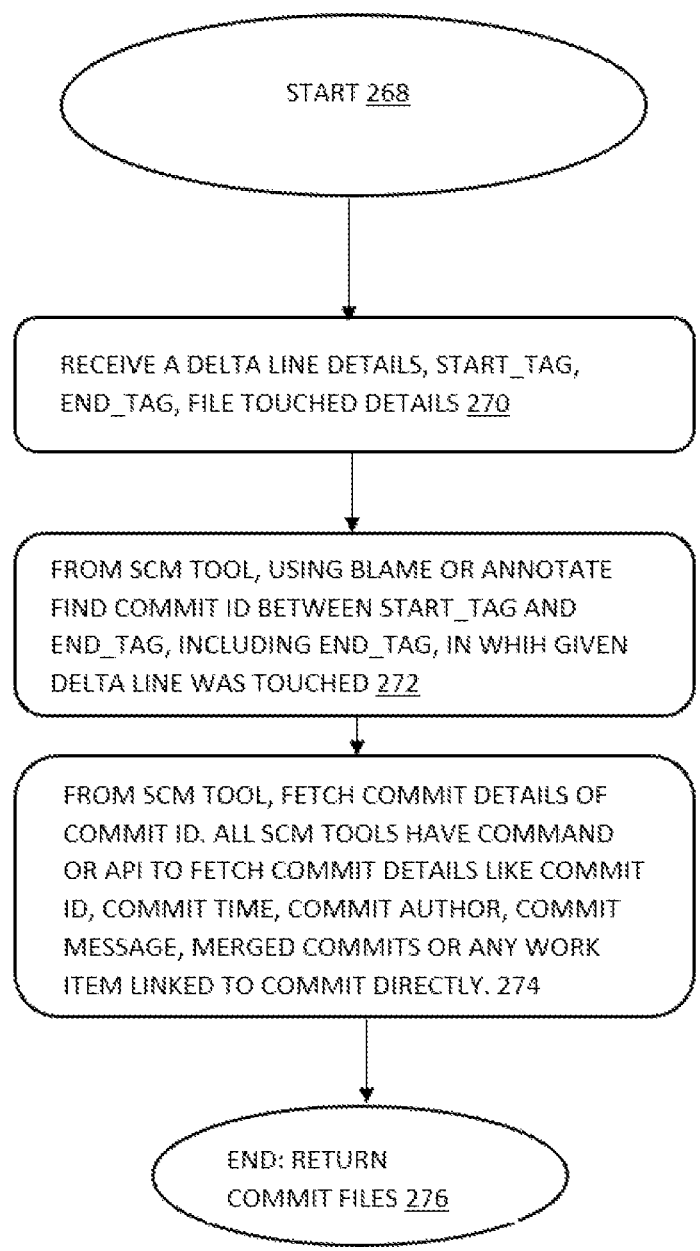
FIG. 2I is a process flow diagram illustrating the process of fetching commit details using the commit details module, in accordance with an embodiment.

FIG. 2I is a process flow diagram illustrating the process of fetching commit details using the commit details module, in accordance with an embodiment. The process starts at step 268. The commit details module takes a delta line, a start tag, an end tag, the file touched details and returns commit details such as the commit ID, a commit time, a commit message, a commit author, merged commits and any work item linked to commit directly. At step 270, a delta line details, the start tag, an end tag and the file touched details are received. At step 272, from SCM tool, using blame or annotate, a commit ID is determined between the start tag and the end tag, including the end tag in which given delta line was touched. At step 274, from the SCM tool, commit details of commit Id is fetched. All the SCM tools have command or API to fetch commit details such as a commit ID, a commit time, a commit author, a commit message, a merged commits and any work item linked to commit directly. At step 276, the commit details are returned.

Figure 2J:
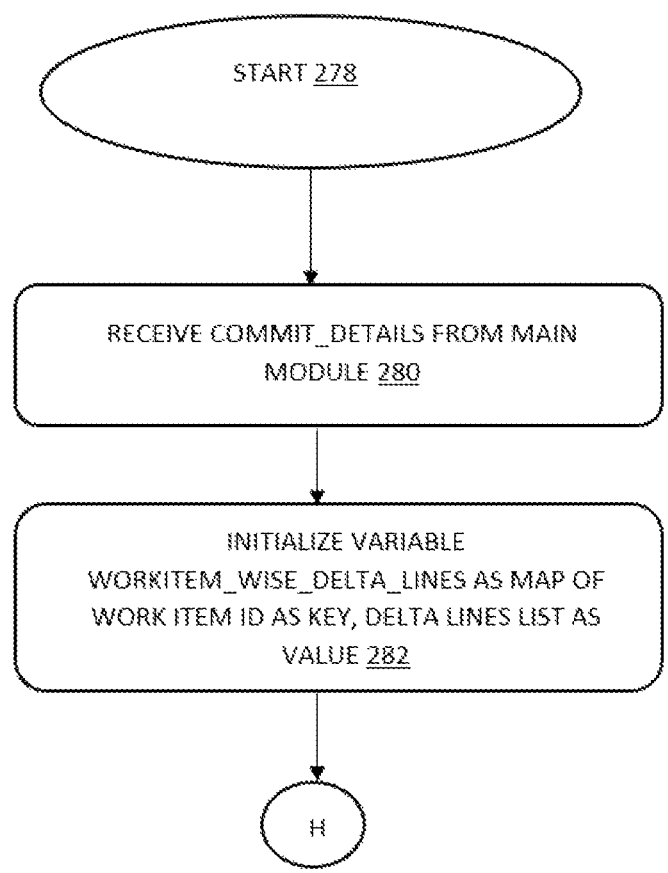
FIG. 2J-2K is a process flow diagram illustrating the process of determining a map with work item id as key and a list of delta lines corresponding to the work item using work item details module, in accordance with an embodiment.
Figure 2K:
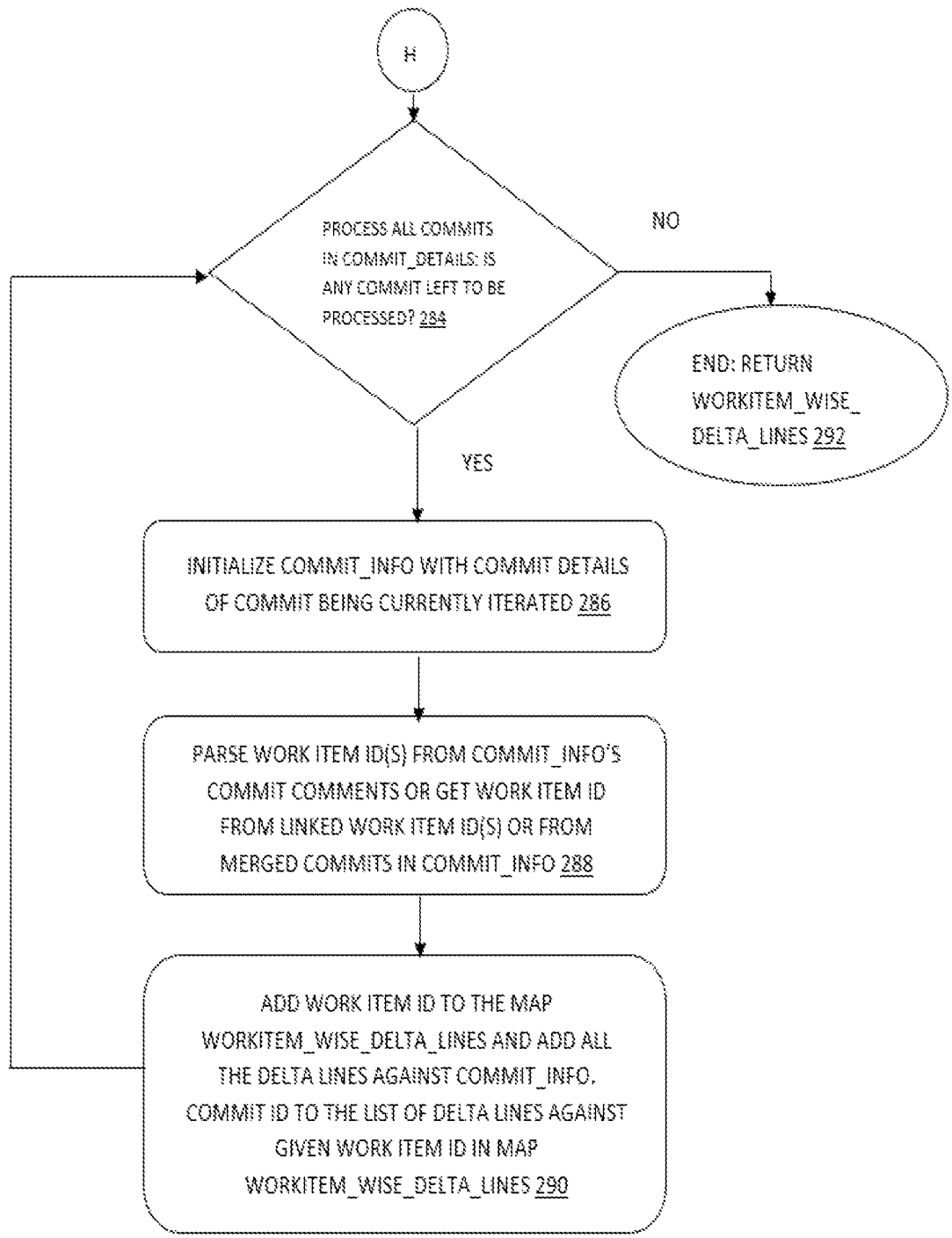
Figure 2L:
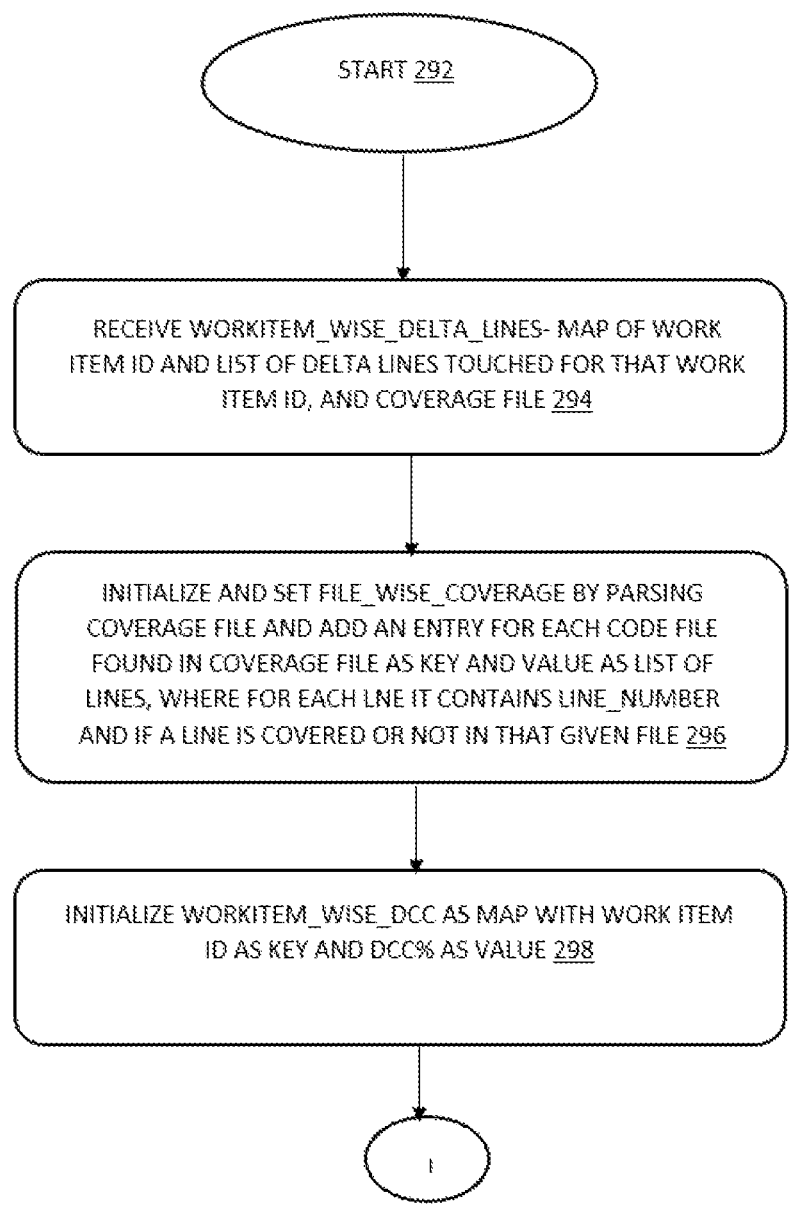
Figure 3A:
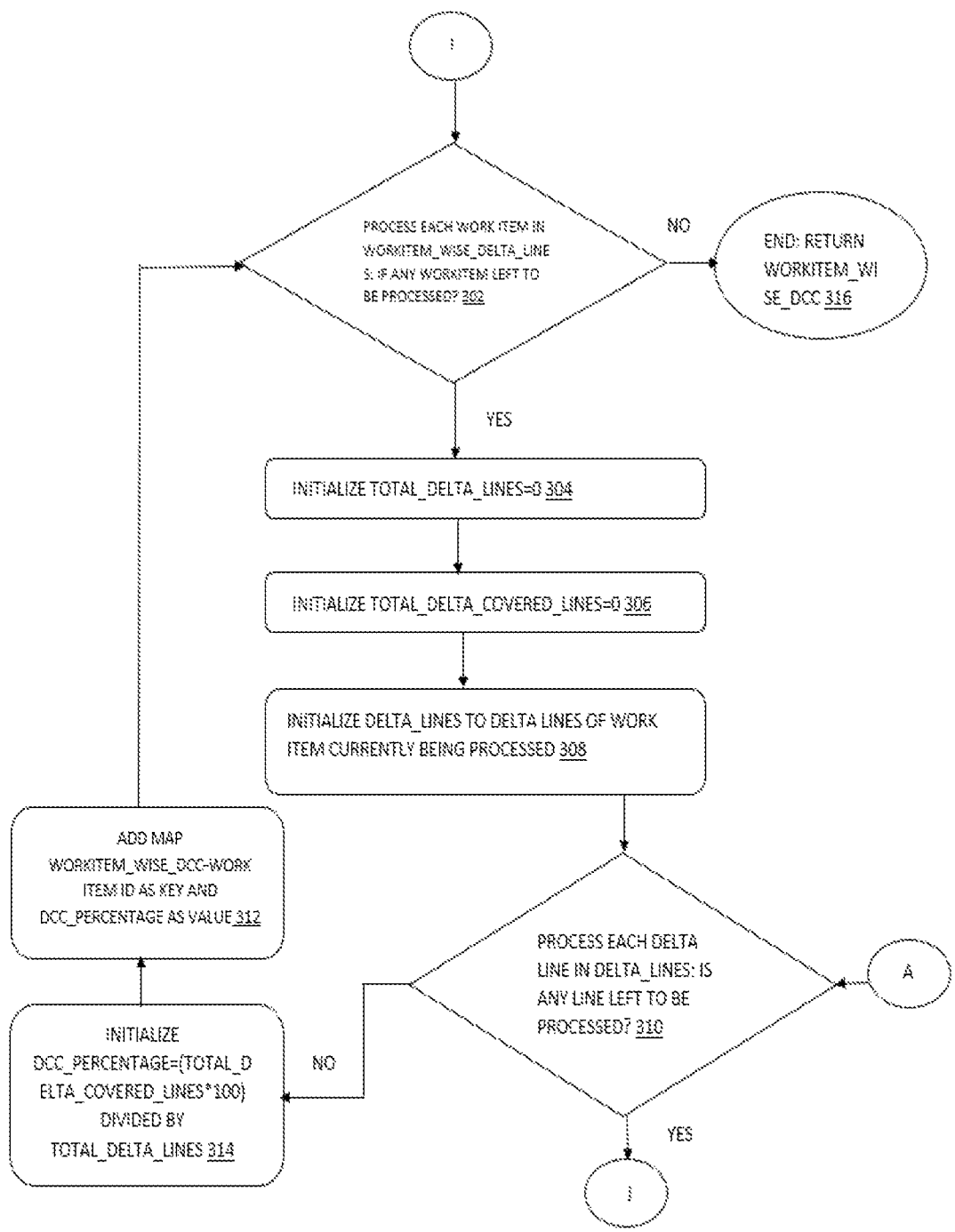
Figure 3B:
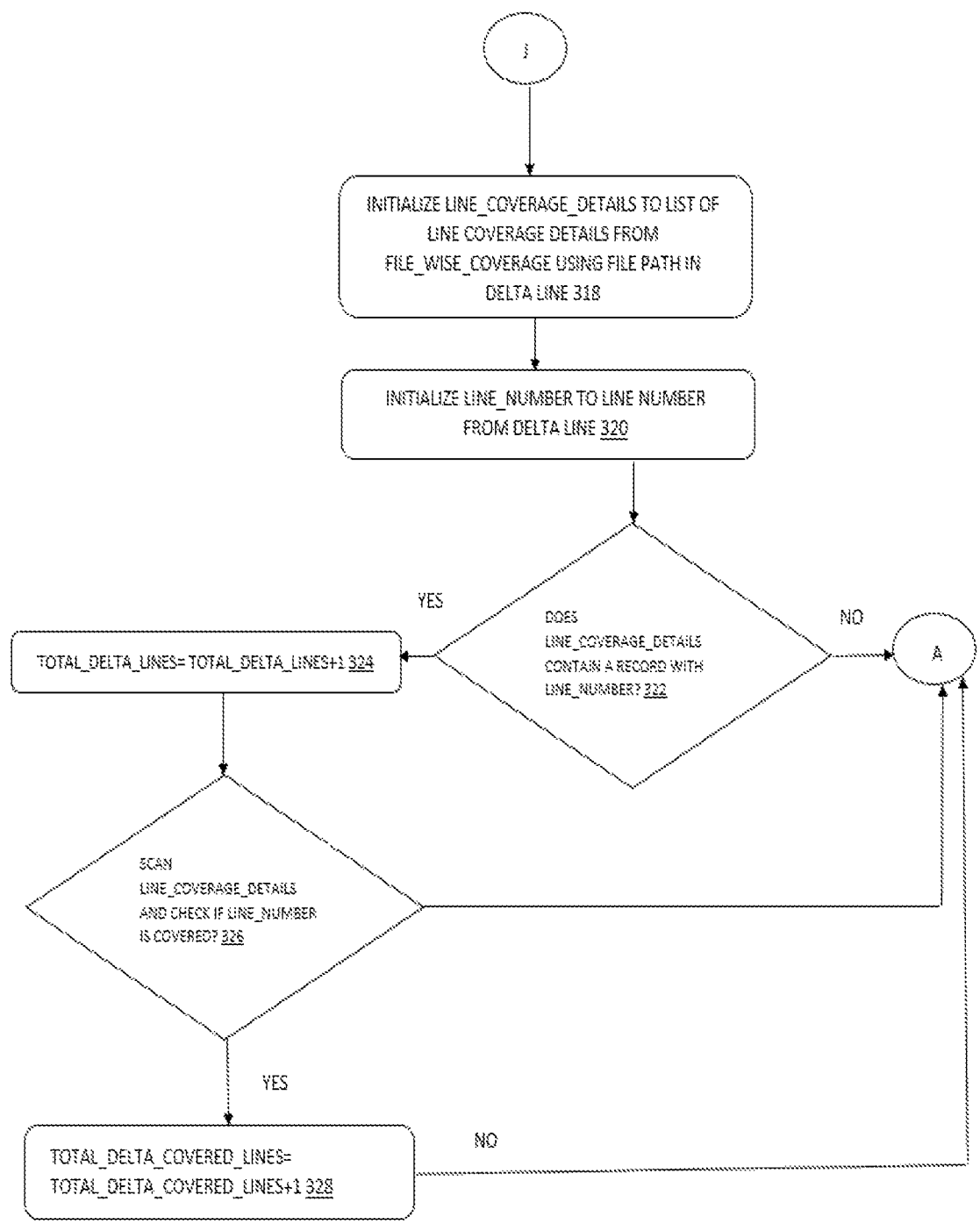

FIG. 2J-2K is a process flow diagram illustrating the process of determining a map with work item id as key and a list of delta lines corresponding to the work item using work item details module, in accordance with an embodiment. The process begins at step 278. The work item details module takes commit details map passed from main module and returns work item wise segregated delta lines. At step 280, the commit_details are received from work item details module. At step 282, the variable workitem_wise_delta_ lines are initialized as map of the work item id as key and the delta lines list as value. At step 284, all the commits in commit details are processed. If any commit is left to be processed then at step 286 commit_info is initialized with commit details of commit being currently iterated. At step 288, work item id(s) are parsed from commit_info's commit comments or the work item id are obtained from linked work item id(s) or from merged commits in commit_info. At step 290, a work item id is added to map workitem_wise_delta_ lines and all delta lines are added against commit_info. The commit ID is included to the list of delta lines against the given work item id in map workitem_wise_delta_lines. The steps 284 to 290 are repeated. In this way, at step 284, if there is no commit left to be processed then at step 292, return workitem_wise_delta_lines.

FIG. 2L-3B is a process flow diagram illustrating the process of computing delta code coverage information using delta code coverage module, in accordance with an embodiment. The process starts at step 292. The delta code coverage module takes workitem_wise_delta_lines, map of work item id and list of delta lines touched for the corresponding work item id, and coverage file. For each work item, the delta code coverage module calculates total number of executable lines touched and total lines covered from coverage file. The total lines touched and total lines covered is then used to calculate DCC for the corresponding work item. At step 294, workitem_wise_delta_lines, a map of the work item id and a list of delta lines touched for the corresponding work item id and the coverage file are received. At step 296, file_wise_ coverage is initialized and set by parsing the coverage file and an entry is added for each code file found in the coverage file as a key and a value as list of lines, such that for each line it contains line number and it further includes if a line is covered or not in the corresponding given file. At step 298, workitem_wise_dcc is initialized as map with work item id as key and DCC % as value. At step 302, each work item in workitem_wise_delta_lines are processed. If no work item is left to be processed then the workitem_wise_dcc is returned at step 316.

If any work item is left to be processed then at step 304, total_delta_lines is initialized to zero. At step 306, total_delta_covered_lines are initialized to zero. At step 308, delta lines are initialized to the delta lines of the work item currently being processed. At step 310, each of the delta lines is processed. If no delta line is left to be processed step 314 is performed. At step 314, the dcc_percentage is initialized to (total_delta_covered_lines*100) divided by total_delta_lines. At step 312, a map workitem_wise_dcc, work item id as key and dcc_percentage as value is added. Again, the steps 32 to 312 are repeated. If any delta line is left to be processed then step 318 is performed. At step 318, the line_coverage_details are initialized to a list of line coverage details from file_wise_coverage using file path in delta line. At step 320 line number is initialized to a line number from the delta line. At step 322 it is determined if line coverage details contains a record with line number. If not then steps 310 to 322 are repeated. If it contains then step 324 is performed. At step 324, total_delta_lines is equal to total_delta_lines plus one. At step 326, line coverage details are scanned and if line number is covered it is determined. If it is covered then at step 328, it is checked if total_delta_covered_lines is equal to total_delta_covered_lines plus one. If not then steps 310 to 328 are repeated.

Figure 4:
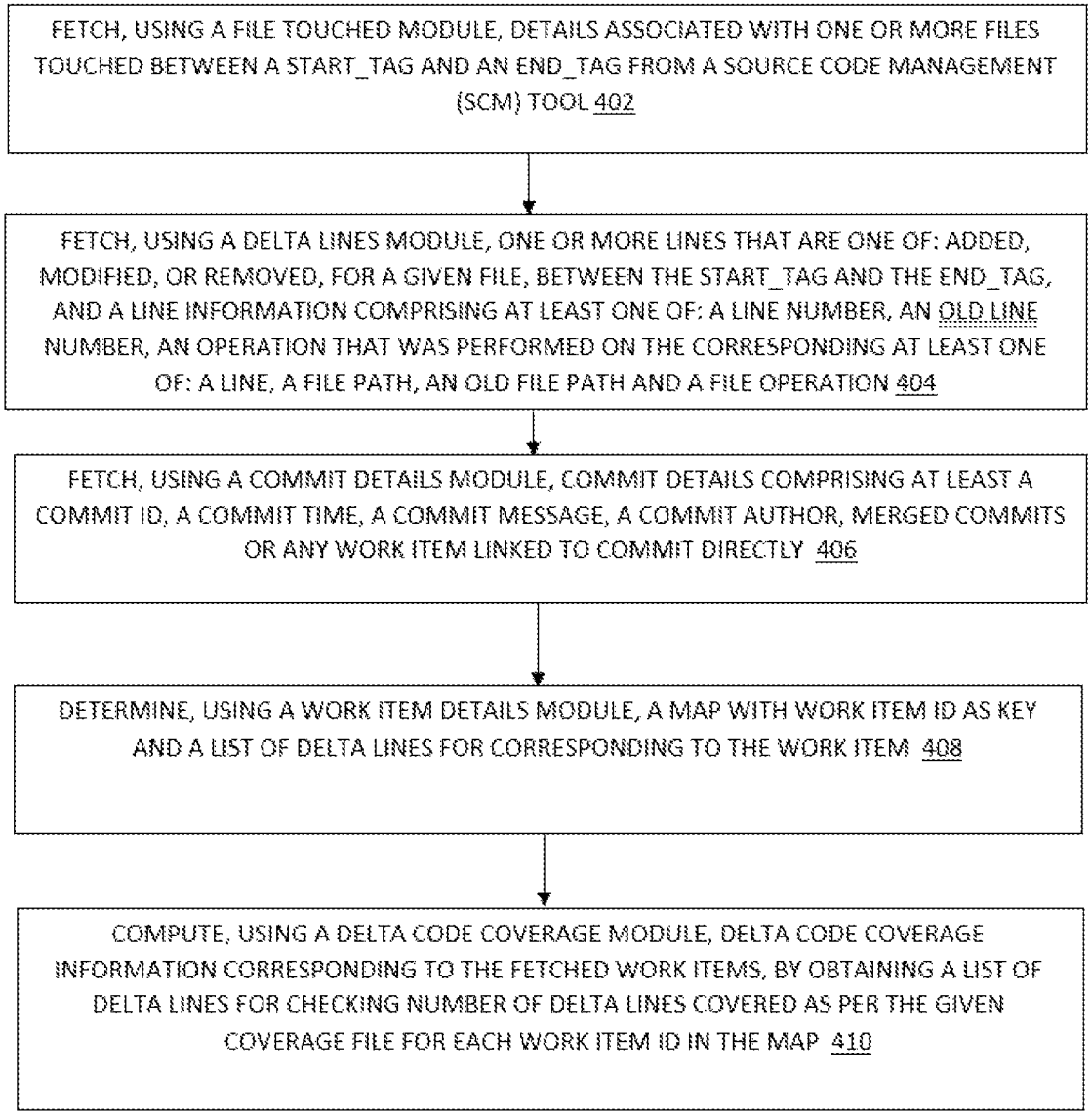
FIG. 4 illustrates a flow diagram of method of providing delta code coverage information for work items, in accordance with an embodiment.

FIG. 4 illustrates the flow diagram of method and system providing delta code coverage information for work items. At step 402, using a file touched module, details associated with one or more work items (work items) touched between a start tag and an end tag from a source code management (SCM) tool are fetched. At step 404, using a delta lines module, one or more lines are fetched, that are one of: added, modified, or removed, for a given file, between the start tag and the end tag, and a line information comprising at least one of: a line number, an old line number, an operation that was performed on the corresponding at least one of: a line, a file path, an old file path and a file operation At step 406, using a commit details module, commit details are fetched which comprises at least a commit ID, a commit time, a commit message, a commit author, merged commits or any work item linked to commit directly. At step 408, using a work item details module, a map with work item id as key and a list of delta lines for corresponding to the work item are determined. At step 410, using a delta code coverage module, delta code coverage information corresponding to the fetched work items are computed, by obtaining a list of delta lines for checking number of delta lines covered as per the given coverage file for each work item id in the map.

Various embodiments disclosed herein provide a system and method of providing delta code coverage information for work items. The various embodiment of the present technology enables DCC at work item level. The system of the present technology is capable of identifying and segregating lines touched in same file for different work items, for accurate DCC. The computing of DCC at work item level enables teams to quickly identify work items with low DCC, enforce area, module, product and like-wise DCC criteria. The system of the present technology can share the machine with other SCM or ALM systems without requiring any additional configuration to be done in system. The system of the present technology can be extended to fetch any other work item information like assignee, area path, team, release, component, product, sprint and like from ALM tool. The system of the present technology can be tuned to identify DCC at component, product, team, release and like, on basis of work item data. The system of the present technology is intended to work with any SCM analysis tool or it is not limited to a specific tool.

As will be readily apparent to those skilled in the art, the present invention may easily be produced in other specific forms without departing from its essential characteristics. The present embodiments are, therefore, to be considered as merely illustrative and not restrictive, the scope of the invention being indicated by the claims rather than the foregoing description, and all changes which come within therefore intended to be embraced therein.

A "non-transitory computer-readable medium" for purposes of embodiments of the pre-sent invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

The embodiments herein can take the form of, an entirely hardware embodiment, an entirely software embodiment or an embodiment including both hardware and software elements. The embodiments that are implemented in software include but are not limited to, firmware, resi-dent software, microcode, and the like. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semi-conductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, Sub-scriber Identity Module (SIM) card, and cache memories which provide temporary storage of at least some program code in order to reduce the number of times code must be retrieved from bulk storage during execution. Input/output (I/O) devices (including but not limited to key-boards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims.

What is claimed is:

1. A processor-implemented method for computing delta code coverage information (DCC) for work items, the method comprising the following steps:

fetching details associated with one or more files touched between a start tag and an end tag from a source code management (SCM) tool, and wherein the details include a current file path, an old file path, and a file operation performed on each of the touched files, and wherein the file operation comprises adding, renaming, modifying, and, deleting performed between the start tag and the end tag on each of the touched files;

fetching one or more lines that were one of: added, modified, or removed, for each of the touched files, and identifying the one or more lines that were one of: added, modified, or removed as delta lines, and wherein the step of fetching the one or more lines further includes the following steps:

executing a 'diff' command on a touched file, between the old file path, wherein the old file path is stored in the start tag, and the current file path, wherein the current file path is stored in the end tag;

displaying a subset of the delta lines that were previously touched by commit commands, and further displaying an operation performed on each previously touched delta line in an event the touched file was renamed or modified; and fetching all the lines of the touched file that were added, from the current file path stored in the end tag;

fetching line information corresponding to each of the delta lines, and wherein the line information comprises a line number, an old line number, the file operation, and a specific operation performed on at least one of: the delta lines, the current file path, and the old file path;

fetching commit details corresponding to each of the commit commands that touched the delta lines, said commit details comprising at least respective commit identifiers (ID), commit times, commit messages, commit authors, merged commits, and the work items directly linked to each of the commit commands that touched the delta lines;

for every commit ID found between the start tag and the end tag, for a respective renamed touched file, implementing a blame or annotate command on the old file path instead of the current file path, and fetching the commit details for each of the commit IDs based on the implementation of the blame or annotate command;

creating a map with work item identifiers (IDs) as a key and a list of the delta lines corresponding to each of the work items identified by the work item IDs, and wherein the step of creating the map with the work item IDs as the key further includes:

initializing a variable termed 'work item-wise-delta-lines' as the map of the work item IDs and the list of the delta lines corresponding to each of the work items;

iterating the commit details for each of the commit IDs and segregating the delta lines according to the work items, and returning work items-wise segregated delta lines;

parsing the work item IDs from commit comments or linked work item IDs or the merged commits; and adding the work item IDs to the map termed 'work item-wise-delta-lines' and adding all the delta lines corresponding to a commit ID being iterated to the list of the delta lines; and computing the delta code coverage information corresponding to each of the work items, by checking the list of the delta lines corresponding to each of the work item IDs for a number of the delta lines covered as per a corresponding coverage file.

2. The processor-implemented method of claim 1, further comprises receiving at least one of the start tag, the end tag, code coverage file data, by a user via an interface, prior to fetching details associated with the work items.

3. The processor-implemented method of claim 1, wherein the step of fetching the details associated with the one or more files touched between the start tag and the end tag further comprises the following steps:

fetching each of the touched files using a P4 diff2 command or a Git Diff command, and wherein the Git Diff command provides, for each of the touched files, file information comprising at least the current file path, the old file path, and the file operation performed;

iterating the touched files fetched using the P4 diff2 command or the Git Diff command; and filtering the files fetched using the P4 diff2 command or the Git Diff command and returning any remaining touched files.

4. The processor-implemented method of claim 3, wherein the step of iterating on the fetched files further comprises:

obtaining a variable termed 'file-operation' from the each of the touched files, in an event a value stored in the variable 'file-operation' is not equal to renamed';

setting the old file path as the current file path for the each of the touched files, based on the file information, when the value stored in the variable 'file-operation' is not equal to 'renamed'; and adding each of the touched files to an array named 'file-touched', when the value stored in the variable 'file-operation' for each of the touched files is not equal to 'removed'.

5. The processor-implemented method of claim 1, wherein the step of obtaining the list of the delta lines further comprises:

initializing a variable termed 'delta-lines' as an array of the line information;

skipping a delta line and executing a next delta line in an event a value stored in a variable 'line-operation' corresponding to a skipped delta line is equal to 'removed'; and adding the line information corresponding to each of the delta lines, including at least the line number, the specific operation performed on each of the delta lines, a file name, the current file path, and the file operation performed on each of the touched files containing the delta lines, to the variable 'delta-lines'.

6. The processor-implemented method of claim 1, wherein the step of computing the delta code coverage information further comprises:

parsing the coverage file and storing parsed information in a file-wise map, and wherein the parsed information includes information about whether the delta lines present in the each of the touched files are covered in the coverage file;

initializing a variable termed 'work item-wise-dcc' as a map containing the work item IDs as the key and DCC percentage as a value;

iterating through each of the work items identified by the work item IDs specified in the map termed 'work item-wise-delta-lines'; calculating the DCC percentage based on variables 'total-delta-covered-lines' and 'total-delta-lines';

adding to the map 'work item-wise-dcc', the work item IDs as the key and the DCC percentage as the value;

initializing the variables 'total-delta-lines' and 'total-delta-covered-lines' to zero; and iterating through the delta lines corresponding to each of the work items identified by the work item IDs, by:

fetching line coverage details from the file-wise map using the current file path corresponding to each of the delta lines; considering line numbers corresponding to each of the delta lines and incrementing a value stored in the variable 'total-delta-lines' if the line numbers exist in the line coverage details corresponding to the each of the touched files; and considering the line numbers corresponding to each of the delta lines and incrementing a value stored in the variable 'total-delta-covered-lines' if the line numbers exist in the line coverage details corresponding to the each of the touched files and if corresponding delta lines are covered as per the line coverage details.

7. The processor-implemented method of claim 6, further comprising obtaining the delta code coverage information in any file format and converting the delta code coverage information into a map of files with the line coverage details.

8. A system for providing delta code coverage (DCC) information for work items, the system comprising:

a memory; and a processor configured to provide delta code coverage information for one or more files, the processor configured to:

fetch details associated with one or more files touched between a start tag and an end tag from a source code management (SCM) tool, and wherein the details include a current file path, an old file path, and a file operation performed on each of the touched files, said processor further configured to perform the file operation comprises adding, renaming, modifying, and, deleting performed between the start tag and the end tag on each of the touched files;

fetch one or more lines that were one of: added, modified, or removed, for each of the touched files, and identify the one or more lines that were one of: added, modified, or removed as delta lines, and wherein the processor is further configured to:

execute a 'diff' command on a touched file, between the old file path, wherein the old file path is stored in the start tag and the current file path, wherein the current file path is stored in the end tag;

display a subset of the delta lines that were previously touched by commit commands and further display an operation performed on each previously touched delta line, in an event the touched file was renamed or modified; and fetch all the lines of the touched file that were added, from the current file path stored in the end tag;

fetch line information corresponding to each of the delta lines, and wherein the line information comprises a line number, an old line number, the file operation, and a specific operation performed on at least one of: the delta lines, the current file path, and the old file path;

fetch commit details corresponding to each of the commit commands that touched the delta lines, said commit details comprising at least respective commit identifiers (IDs), commit times, commit messages, commit authors, merged commits, and the work items directly linked to each of the commit commands that touched the delta lines;

for every commit ID found between the start tag and the end tag, for a respective renamed touched file, implement a blame or annotate command on the old file path instead of the current file path, and fetch the commit details for each of the commit IDs based on the implementation of the blame or annotate command;

create a map with work item identifiers (IDs) as a key and a list of the delta lines corresponding to each of the work items identified by the work item IDs, and wherein said processor is further configured to:
  initialize a variable termed 'work item-wise-delta-lines' as the map of the work item IDs and the list of the delta lines corresponding to each of the work items;
  iterate the commit details for each of the commit IDs and segregate the delta lines according to the work items, and return work items-wise segregated delta lines;
  parse the work item IDs from commit comments or from linked work item IDs or from the merged commits; and
  add the work item IDs to the map termed 'work item-wise-delta-lines' and add all the delta lines corresponding to a commit ID being iterated to the list of the delta lines; and
compute the delta code coverage information corresponding to each of the work items, by checking the list of the delta lines corresponding to each of the work item IDs for a number of the delta lines covered as per a corresponding coverage file.

9. The system of claim 8, wherein the processor receives at least one of: the start tag, the end tag, code coverage file data, by a user via an interface, prior to fetching details associated with the work items.

10. The system of claim 8, wherein the processor is further configured to:
  fetch each of the touched files by using a P4 diff2 command or a Git Diff command, and wherein the Git Diff command provides, for each of the touched files, file information comprising at least the current file path, the old file path, and the file operation performed;
  iterate the touched files fetched using the P4 diff2 command or the Git Diff command; and
  filter the files fetched using the P4 diff2 command or the Git Diff command and any remaining touched files.

11. The system of claim 8, wherein the processor is further configured to:
  obtain a variable termed 'file-operation' from each of the touched files, in an event a value stored in the variable 'file-operation' is not equal to 'renamed';
  set the old file path as the current file path of for each of the touched files, based on the file information, when the value stored in the variable 'file-operation' is not equal to 'renamed'; and
  add each of the touched files to an array named 'file-touched' when the value stored in the variable 'file-operation' for each of the touched files is not equal to 'removed'.

12. The system of claim 8, wherein the processor is further configured to:
  initialize a variable termed 'delta-lines' as an array of the line information;
  skip a delta line and executing a next delta line in an event a value stored in a variable 'line-operation' corresponding to a skipped delta line is equal to 'removed'; and
  add the line information corresponding to each of the delta lines, including at least the line number, the specific operation performed on each of the delta lines, a file name, the current file path, and the file operation performed on the each of the touched files containing the delta lines, to the variable 'delta-lines'.

13. The system of claim 8, wherein the processor is further configured to:
  parse the coverage file and store parsed information in a file-wise map, and wherein said parsed information includes information about whether the delta lines in the each of the touched files are covered in the coverage file;
  initialize a variable termed 'work item-wise-dcc' as a map containing the work item IDs as the key and DCC percentage as a value; iterate through each of the work items identified by the work item IDs specified in the map termed 'work item-wise-delta-lines';
  calculate the DCC percentage based on values stored in variables 'total-delta-covered-lines' and 'total-delta-lines';
  add to the map 'work item-wise-dcc', the work item IDs as the key and the DCC percentage as the value;
  initialize the variables 'total-delta-lines' and 'total-delta-covered-lines' to zero; and
  iterate through the delta lines corresponding to each of the work items identified by the work item IDs, by:
    fetching line coverage details from the file-wise map using the current file path corresponding to each of the delta lines;
    considering line numbers corresponding to each of the delta lines and incrementing a value stored in the variable 'total-delta-lines' if the line numbers exist in the line coverage details corresponding to the each of the touched files; and
    considering the line numbers corresponding to each of the delta lines and incrementing a value stored in the variable 'total-delta-covered-lines' if the line numbers exist in the line coverage details corresponding to the each of the touched files and if corresponding delta lines are covered as per the line coverage details.

14. The system of claim 13, wherein the delta code coverage information is obtained in any file format and converted into a map of files with the line coverage details.

* * * * *